(No Model.) 2 Sheets—Sheet 1.
G. DRUMMOND, Jr.
DEVICE FOR HOLDING SPIGOTS, &c.
No. 285,590. Patented Sept. 25, 1883.
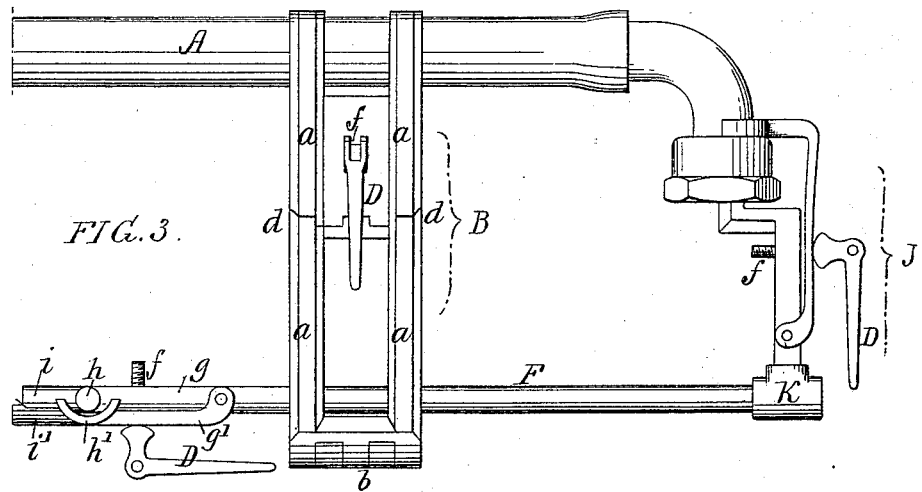
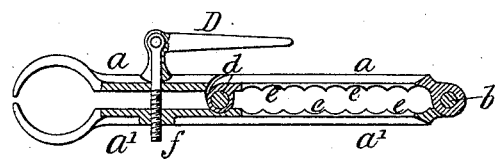
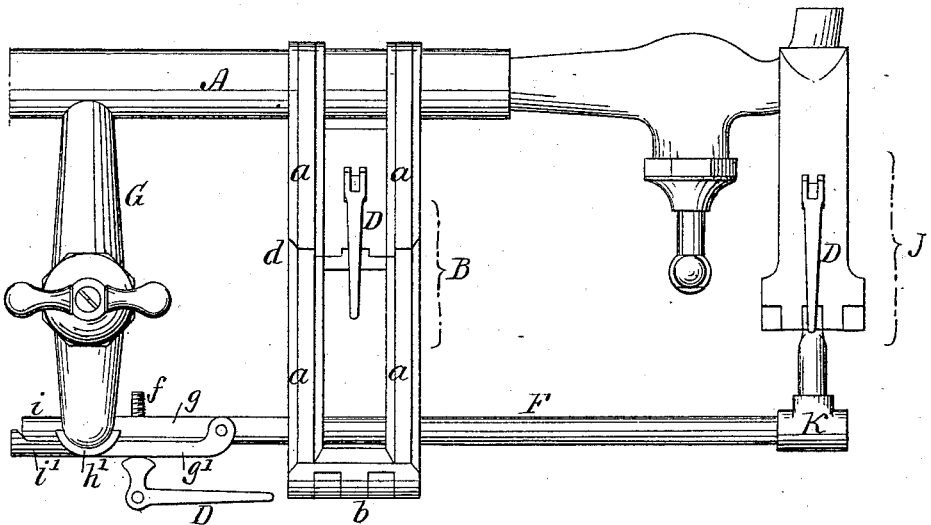
WITNESSES:
David Williams
John E. Barker
INVENTOR:
George Drummond Jr
by his attorneys
Howson & Son (No Model.) 2 Sheets—Sheet 2.
G. DRUMMOND, Jr.
DEVICE FOR HOLDING SPIGOTS, &c.
No. 285,590. Patented Sept. 25, 1883.
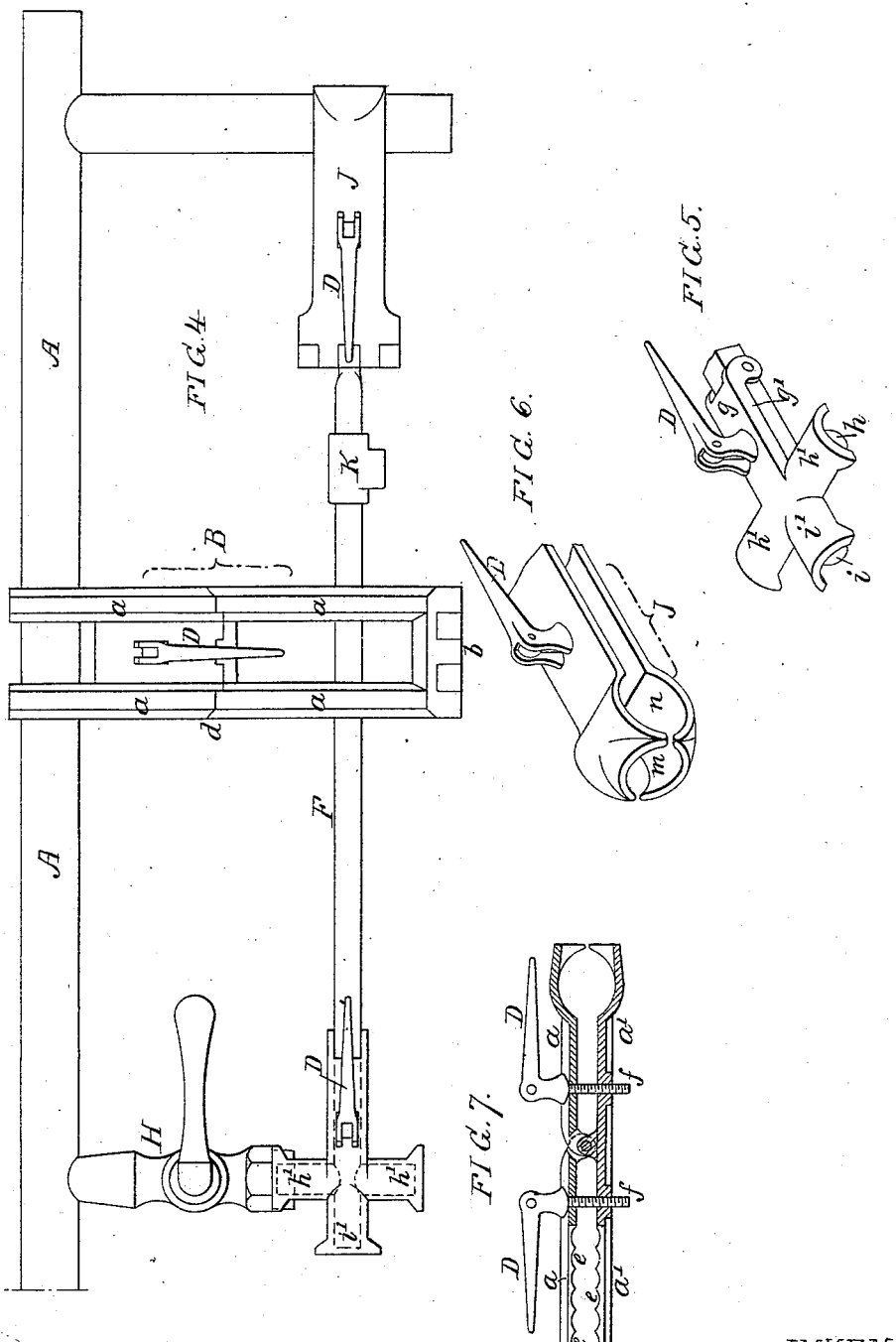
WITNESSES:
David Williams
John E Parker
INVENTOR:
George Drummond Jr.
by his Attorneys
Howson & Sons

UNITED STATES PATENT OFFICE.

GEORGE DRUMMOND, JR., OF PHILADELPHIA, PENNSYLVANIA.

DEVICE FOR HOLDING SPIGOTS, &c.

SPECIFICATION forming part of Letters Patent No. 285,590, dated September 25, 1883.

Application filed July 26, 1883. (No model.)

*To all whom it may concern:*

Be it known that I, GEORGE DRUMMOND, Jr., a citizen of the United States, and a resident of Philadelphia, Pennsylvania, have invented certain Improvements in Devices for Holding Spigots, &c., of which the following is a specification.

The object of my invention is to provide plumbers with an effective clamping device for holding valves, faucets, couplings, &c., in proper position in respect to a pipe while the solder joint is being formed; and this object I attain in the manner hereinafter set forth, reference being had to the accompanying drawings, in which—

Figure 1, Sheet 1, is a view of a piece of pipe with my improved clamp and holder, the latter being constructed for retaining two faucets, one in line with the pipe and the other at right angles thereto; Fig. 2, a sectional view of the clamp; Fig. 3, a view similar to Fig. 1, but showing one holder constructed to retain an elbow-coupling; Fig. 4, Sheet 2, a view of a piece of pipe, showing other methods of using the holders; Fig. 5, a perspective view of one form of holder; Fig. 6, a perspective view of another form, and Fig. 7 a sectional view of a modified form of clamping device.

A is a piece of pipe to which is to be secured a valve, faucet, elbow pipe or coupling.

B is a clamp comprising two jaws, $a\ a'$, pivoted together at the outer end $b$, the upper jaw, $a$, having a joint at $d$, and the inner ends of the jaws being bent, so as to be adapted to the pipe A. Through an opening in the upper jaw, $a$, passes a stem, $f$, the lower end of which is threaded and adapted to a threaded opening in the lower jaw, $a'$, and to the upper end of this stem is hung a cam-lever, D, which serves as a handle to turn the stem, and is adapted to bear upon the inner section of the upper jaw, $a$. In the outer section of this jaw and in the lower jaw, $a'$, are formed recesses $e$ for the reception of a rod, F, which carries the devices for clamping and holding the various attachments. When the rod has been adapted to two of these recesses, and the bent ends of the jaws to the pipe A, the operation of the cam-lever D will effect first the contraction of the jaws to the pipe, and then the depression of the joint $d$, so as to firmly grip the rod F between the jaws. The adjustment of the rod $f$ is rendered necessary, in order to adapt the jaws to pipes A of different sizes, and a series of recesses, $e$, is demanded, as the rod F must occupy a position in respect to the pipe dependent upon the length of the valve or faucet which is to be attached thereto, and, moreover, must be closer to the joint $b$ when the pipe is large than when the pipe is small.

The devices for holding the various attachments comprise clamping-jaws, the construction of which is varied to accord with the character of the attachment. Thus the clamp shown in Fig. 5 for holding the faucet G, Fig. 1, or spigot H, Fig. 4, at right angles to the pipe has jaws $g\ g'$ in the shape of a cross, one of the arms, $h$, of the jaw $g$ entering the mouth of the faucet or spigot, and the corresponding arm, $h'$, of the other jaw, $g'$, bearing upon the outside of the same, as shown in Figs. 1 and 4. If the faucet is turned so that its mouth is in line with the pipe, the arms $i\ i'$ of the jaws would be used to clamp the said faucet. To hold a faucet at the end of the pipe, as in Fig. 1, or an elbow-pipe, as in Fig. 4, a straight clamp, J, is used, this clamp being connected to the rod F by a T-coupling, K, so that it can be used either at right angles to the pipe A or in line therewith, as shown, and the jaws of the clamp having at the outer ends recesses $m$ and $n$ at right angles to each other, so as to adapt the clamp for use in either of the positions shown.

For holding an elbow-coupling such as shown in Fig. 3, the outer ends of the jaws of the clamp J are bent for adaptation to the coupling, one jaw entering the pipe and the other bearing on the outside of the same.

All of the clamps shown are operated by a cam-lever, D, and while this is preferred it is not absolutely essential; nor is it necessary that the jaws of the clamp B should be operated by a single lever, as the jaws for clamping the pipe may be independent of the jaws for clamping the rod F, and operated by a separate lever, as shown, for instance, in Fig. 7.

I claim as my invention—

1. The combination of the rod F, having a device for holding an attachment, as described, with a clamp, B, having jaws constructed for clasping a pipe and for clamping the rod F, as set forth.

2. The clamp B, having a jaw, $a'$, a double-jointed jaw, $a$, and means for compressing the jaws, as set forth.

3. The combination of the jaws of the clamp, the threaded rod $f$, and the lever D, hung to said rod, as set forth.

4. The combination of the rod F with the pipe-clamping device B, and having a series of recesses, $e$, for the rod F, as set forth.

5. The combination of the rod F and a clamp, B, adapted to secure the same to a pipe, with attachment-holders having clamping-jaws at right angles to each other, as set forth.

6. The combination of the rod F and a clamp, B, adapted to secure the same to a pipe, with a clamp for holding an attachment, and with a T-coupling, K, as set forth.

In testimony whereof I have signed my name to this specification in the presence of two subscribing witnesses.

GEO. DRUMMOND, JR.

Witnesses:
HARRY DRURY,
JOHN E. PARKER.